Jan. 14, 1964   J. DREEBEN   3,117,639
WEIGHING APPARATUS
Filed Dec. 29, 1960   2 Sheets-Sheet 1
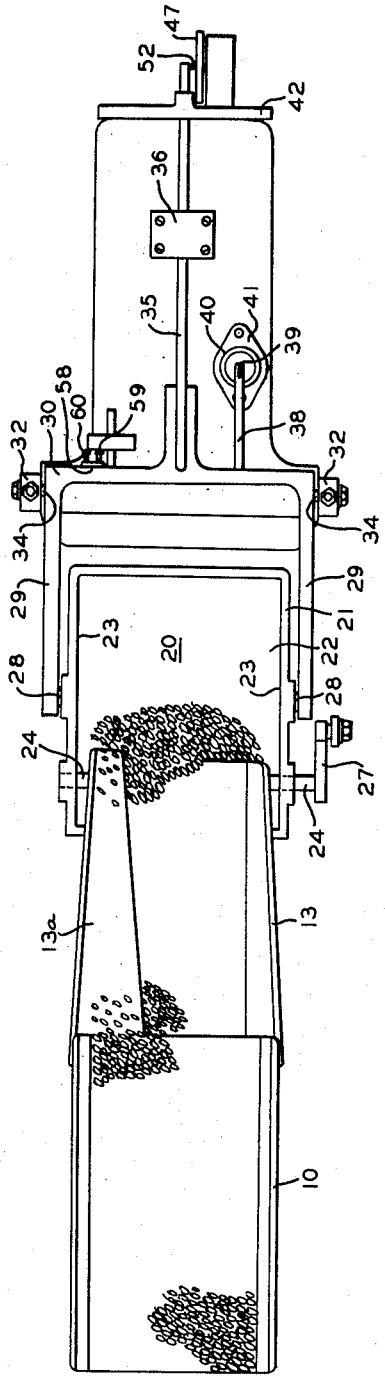
INVENTOR.
JACK DREEBEN
BY
ATTORNEY Jan. 14, 1964   J. DREEBEN   3,117,639
WEIGHING APPARATUS
Filed Dec. 29, 1960   2 Sheets-Sheet 2
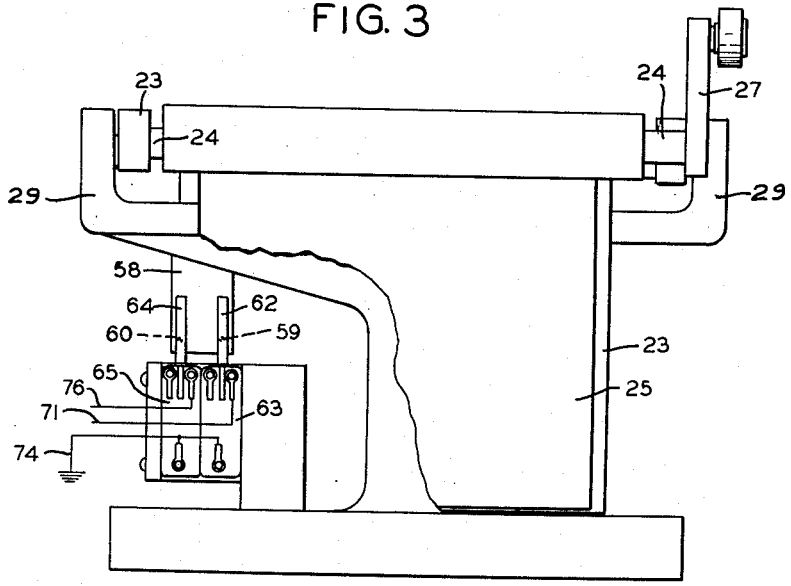
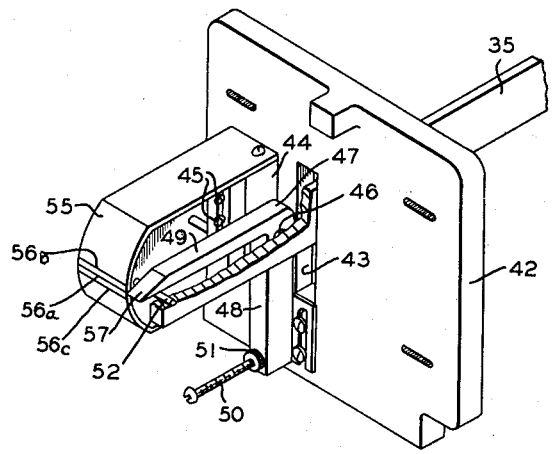
INVENTOR.
JACK DREEBEN
BY
ATTORNEY

# United States Patent Office 3,117,639
Patented Jan. 14, 1964

3,117,639
WEIGHING APPARATUS
Jack Dreeben, % Mercury Heat Sealing Equipment Co.,
2601 N. Howard St., Philadelphia, Pa.
Filed Dec. 29, 1960, Ser. No. 79,241
6 Claims. (Cl. 177—63)

This invention relates to weighing apparatus, and more particularly to apparatus for delivering predetermined quantities, measured as to weight, of materials of small size or granular form for packaging.

In the weighing of measured quantities of materials for packaging, difficulties have arisen in measuring to a close tolerance because of inertia involved in the equipment. As a result of this there is a tendency to supply an excessive quantity of material. It is accordingly desirable to overcome the failure of the scale to respond in a manner which permits of cutoff of delivery of the fluent material at the precise time desired.

It has heretofore been proposed to employ dash pots for reducing the tendency of the scale to override, particularly because of the impact of the materials delivered to the weighing hopper but these have not produced the desired results.

It has heretofore also been proposed to provide chutes with bulk vibrators and dribble vibrators, with the main delivery effected by actuation of the bulk vibrator and with additional limited delivery effected by a dribble vibrator. Difficulties have been encountered in controlling the vibrators, and particularly the dribble vibrators, with the precision desired.

It is the principal object of the present invention to provide improved weighing apparatus for delivering measured charges of material to be packaged and with which a close control of quantity of material that is delivered can be effected.

It is a further object of the present invention to provide improved weighing apparatus having a simple but effective control for delivering material to be weighed.

It is a further object of the present invention to provide measuring apparatus for delivering a predetermined measured quantity of fluent material to a delivery hopper having an improved damping device for the hopper mounting.

It is a further object of the present invention to provide improved measuring apparatus for the supplying of measured quantities of material for packaging in which a hopper mounted on a scale arm is provided together with improved damping apparatus for the scale arm.

It is a further object of the present invention to provide, in a measuring scale having a scale arm, a force applying device for damping the movement of the scale arm.

It is a further object of the present invention to provide, in a measuring scale having a scale arm, a force applying device for damping the movement of the scale arm in which a portion of the damping device also serves as an indicator.

It is a further object of the present invention to provide in a measuring scale having a movable scale arm, a movable force applying device for retarding the movement of the scale arm, the force increasing as the balanced condition is approached.

Other objects and advantageous features of the invention will be apparent from the description and claims.

The nature and characteristic features of the invention will be more readily understood from the following description, taken in connection with the accompanying drawings forming part thereof, in which:

FIGURE 1 is a top plan view of measuring apparatus embodying the invention;

FIG. 2 is a side elevational view of the structure shown in FIG. 1;

FIG. 3 is a fragmentary sectional view, enlarged, taken approximately on the line 3—3 of FIG. 2, parts being broken away to show the switch controls; and FIG. 4 is a fragmentary perspective view of a preferred form of damping apparatus in accordance with the present invention.

It should, of course, be understood that the description and drawings herein are illustrative merely, and that various modifications and changes can be made in the structure disclosed without departing from the spirit of the invention.

Like numerals refer to like parts throughout the several views.

The weighing apparatus in accordance with the present invention includes a scale arm having a hopper or measuring bucket carried therein for receiving the material to be measured, the scale arm being provided with an adjusting weight movable therealong to a selected position. Provisions are made for supplying fluent material to the measuring bucket with controlled delivery of the material to the measuring bucket.

The scale arm has connected thereto for applying a force thereon, a damping device in which the applied force for opposing movement of the arm varies, and increases, as the arm moves to its set balancing position. The damping device preferably has a portion which serves as an indicator. The movement of the scale arm is utilized for controlled actuating circuits for vibratory feeders for bulk and dribble feed of fluent solid materials to the measuring bucket.

Referring now more particularly to FIGS. 1 and 2 of the drawings, the measuring apparatus in accordance with the invention is there shown, removed from the packaging machine or the like with which the same is intended to be used.

A rear material delivery section is provided in the form of a vibrator channel 10 to which the material to be measured is supplied from any suitable source.

The channel 10 is preferably supported upon and activated by an electrical vibrator unit 11 capable of being vibrated at the desired frequency and amplitude to advance fluent material along the channel 10 for discharge.

The vibrator unit 11 is in turn supported in a frame 12 which is secured in any desired manner to the machine (not shown) with which the same is used.

The channel 10 of the rear delivery section has its forward end in overlapped relation to a front delivery section which includes a main vibrator channel 13 and a dribble vibrator channel 13a. The main channel 13 is supported upon and activated by an electrical vibrator unit 14 which is in turn supported in a frame 15 secured in any desired manner to the machine (not shown) with which the measuring apparatus is used.

The vibrator unit 14 can be of any type capable of being vibrated at the desired frequency and amplitude to advance fluent material along the channel 13 for delivery.

The dribble vibrator channel 13a is preferably also provided with a dribble vibrator unit 16 also supported in the frame 15, which is operated at a predetermined amplitude and frequency for the delivery of limited quantities or even single units of fluent material along the channel 13a to complete a measured quantity and bring the same to the desired weight, as hereinafter explained.

The channels 13 and 13a are preferably in overlapped relation to a measuring bucket 20 which bucket 20 includes a substantially horizontal frame 21 with a downwardly inclined wall 22 extending therefrom and side walls 23 closing the space between the inclined wall 22 and the frame 21.

The frame 21 has pivotally mounted thereon, on pivot pins 24 journaled in the frame 21, a bucket gate 25 for closing the open side. The bucket gate 25 is normally held in closed position by its own weight aided by a spring 26 but is provided with an actuating arm 27 connected to one of the pivot pins 24 for moving the gate 25 to open position as desired.

The frame 21 is pivotally mounted by pivot pins 28 in opposite arm portions 29 of a scale balancing arm 30. The scale arm 30 is pivotally mounted on opposite sides thereof in upright portions 32 of a scale bracket 33 by fulcrum pins 34 and has a balancing arm portion 35 extending therefrom.

The balancing arm portion 35 may be provided with a weight 36 movable therealong to any desired adjusted position determined by the weight of material to be received in the bucket 20 and has a thumb screw 37 for clamping the same at the desired position of adjustment on the arm portion 35.

The scale arm 30 can also be provided with a dash pot lever arm 38 extending therefrom and connected by a rod 39 to a piston (not shown) in a cylinder 40 of a dash pot 41 for reducing the tendency of the scale arm 30 to oscillate.

The scale bracket 33 also is provided with an upright plate 42 having an opening 43 through which the arm portion 35 extends. The plate 42 has a mounting block 44 adjustably mounted thereon by screws 45 with a pivot pin 46 therein for pivotally mounting an inverted L shaped damping lever 47 having a downwardly extending arm 48 and an outwardly or horizontally extending arm 49. The arm 49 serves as a weight tending to resist clockwise movement of the lever 47 as seen in FIG. 4.

A zero position adjusting screw 50 is provided extending through the lower end of the arm portion 48 and engageable with the plate 42 for determining the initial positioning of the lever 47. A lock nut 51 may be provided on the screw 50 for retaining the screw 50 at the desired position of adjustment.

The arm portion 35 preferably has a pin 52 extending therefrom for engagement with the under face of the horizontally extending arm portion 49 for actuating the lever 47 as hereinafter explained.

The block 44 may also have a dial plate 55 of U-shape mounted thereon with suitable balance, over, and under indicia at 56a, 56b and 56c, respectively, and the terminal end 57 of the horizontal arm portion 49 may be shaped to an edge so that its position with respect to the indicia 56a, 56b and 56c may be observed if desired.

The scale arm 30 can also be provided with a switch actuating plate 58 extending downwardly therefrom and carrying a pair of adjustable actuating screws 59 and 60. The actuating screws 59 and 60 may be provided with suitable lock nuts 61 for retaining them in their adjusted positions.

The actuating screw 59 is adapted for engagement with an actuating arm 62 of a bulk control microswitch 63, having normally closed contacts (not shown). The actuating screw 60 is adapted for engagement with an actuating arm 64 of a dribble control microswitch 65, having normally closed contacts (not shown). The actuating arms 62 and 64 of the microswitches 63 and 65 may each be provided with a zero adjusting screw 66 having a lock nut 67 thereon.

Power leads 68 and 69 are provided connected from any suitable source of electrical energy. The lead 68 is connected by a conductor 70 to the vibrator 11 and a conductor 71 is provided therefrom to the microswitch 63. A conductor 72 is provided from the conductor 70 to the front bulk control vibrator 14 and a conductor 73 extends therefrom to the conductor 71. A conductor 74 is provided extending from the bulk microswitch 63 to ground. A conductor 75 is also provided from the source through the conductor 72 to the dribble vibrator 16 and a conductor 76 is provided extending from the dribble vibrator 16 to the dribble control microswitch 65 which also has the connection 74 therefrom to ground.

The mode of operation will now be pointed out.

Assuming that material is available in the vibrator channel 10, and that the rear vibrator 11 is energized, fluent material will be advanced along the channel 10 and delivered to the channels 13 and 13a. The vibrator units 14 and 16 for the channels 13 and 13a are also energized for advancing fluent material in the channels 13 and 13a for delivery into the bucket 20.

As material is delivered to the bucket 20, it tends to attain an amount sufficient to start to overcome the effect of the weight 36. The pin 52, carried by the arm portion 35 in engagement with the underface of the horizontally extending arm portion 49 tends to raise the arm portion 49 and the arm portion 48 connected thereto. The engagement of the pin 52 with the arm portion 49 is effective for applying an opposing force on the arm portion 35 which increases with further upward movement of the arm portion 35. The downwardly extending arm portion 48 is in effect a weight in the nature of a pendulum and only becomes active when the scale arm 20 is close to its balanced position. As the lever 47 is moved by the arm portion 35, the terminal end 57 thereof is successively positioned with respect to the indicia 56c and 56a, and in the event of excessive quantity in the measuring bucket 20, might be possitioned to or beyond the indicia 56b.

The movement of the lever 47 is correlated with that of the switch actuating plate 58 and the positioning of the actuating screws 59 and 60 so that prior to actuation of the lever 47, the vibrators 11, 14 and 16 are all energized. When the arm portion 35 reaches a position such that the pin 52 thereon engages the arm portion 49, the actuating arm 62 of the bulk microswitch 63 is moved to a position to open the contacts of the switch 63. The units 11 and 14 are not longer energized and the channels 10 and 13 are then not vibrated by the vibrating units 11 and 14. The dribble control microswitch 65 is preferably not actuated to open its contacts and with its contacts closed is in a condition such that the dribble vibratory action is made available at the dribble vibrator channel 13a to provide a restricted delivery of fluent material from the channel 13a into the measuring bucket 20.

As the lever 47 reaches a position so that the terminal end 57 becomes aligned with the indicia 56a indicating balance, the actuating arm 64 of the dribble control microswitch 65 is moved to open the contacts of that switch and discontinue further vibratory delivery of fluent material attendant upon vibration by the vibrator unit 16.

The bucket gate 25 can then be actuated to open or discharge position by movement of actuating arm 27 for the discharge of the contents of the measuring bucket 20 to the packaging machine.

As soon as the contents of the measuring bucket have been discharged, the bucket gate 25 can then be closed or permitted to close, and the weight 36 is effective on the balance arm portion 35 to return the scale arm 30 to its original position with the pin 52 out of actuating engagement with the balance arm portion 35 and with the bulk control microswitch 63 and the dribble control microswitch 65 again in positions to energize the rear and front bulk vibrator units 11 and 14 and the dribble vibrator unit 16 for a repetition of the operations previously explained.

The delivery of measured quantities of material is in timed relation to the operation of the packaging machine. The time interval for filling and discharging measured quantities of material in and from the measure bucket 20 is preferably the same as that for package forming and filling in the packaging machine.

I claim:

1. Weighing apparatus comprising a rapid material feed control member, a restricted material feed control member, a receptacle for material delivered under the control of said members, a scale balancing arm having said receptacle carried thereby and having an impelling portion, a weight setting member on said arm, switch members actuating by the positioning of said scale arm for controlling the actuation of each of said feed control members, and a pivotally mounted lever member having a portion positioned for engagement by the impelling portion of said balancing arm in predetermined timed relation to the actuation of said switch members, said lever member upon such engagement applying a movement opposing force on said balancing arm which increases upon movement of said arm towards a balanced position.

2. Weighing apparatus as defined in claim 1 in which said switch members have separate adjustable operating members for controlling the timed actuation thereof in relation to the movement of the scale arm.

3. Weighing apparatus as defined in claim 1 in which a scale member is provided in fixed relation to said balancing arm and said lever member has a balance indicating portion carried thereby.

4. Weighing apparatus comprising a frame, a rapid material feed control member, a restricted material feed control member, a receptacle for material delivered under the control of said members, a scale balancing arm carried by said frame having said receptacle carried thereby and having an impelling portion, a weight setting member on said arm, switch members on said frame actuated by the positioning of said scale arm for controlling the actuation of each of said feed control members, an L-shaped lever pivotally mounted on said frame and having a lever arm for engagement by the impelling portion of said arm in predetermined timed relation to the actuation of said switch members, said lever having a lever arm with an outer terminal end, and a scale member carried on said frame and with respect to which said terminal end is movable for indicating the position of said balance arm, said lever upon movement thereof applying a movement opposing force on said balancing arm which increases upon movement of said balancing arm towards a balanced position.

5. Measuring apparatus comprising a balance arm, a mounting for said balance arm, a receptacle carried by said balance arm on one side of said mounting, a member adjustably carried on said balance arm on the opposite side of said mounting for applying a force in opposition to the weight of material in the receptacle, and a device engageable by the balance arm at a selected location for applying a force on said balance arm in opposition to the force applied by the load in the receptacle in an amount which increases as said arm approaches a balanced condition, said device comprising a lever having a plurality of arms and an operating connection between said balance arm and one of said lever arms, one of said lever arms having an outer terminal end, and a scale member with respect to which said end is movable for indicating the position of said balance arm.

6. Measuring apparatus comprising a balance arm, a mounting for said balance arm, a receptacle carried by said balance arm on one side of said mounting, a member adjustably carried on said balance arm on the opposite side of said mounting for applying a force in opposition to the weight of material in the receptacle, and a device engageable by the balance arm at a selected location for applying a force on said balance arm in opposition to the force applied by the load in the receptacle in an amount which increases as said arm approaches a balanced condition, said device comprising a pivotally mounted L-shaped lever having a plurality of lever arms, one of said lever arms being vertically disposed and the other of said lever arms extending outwardly, an operating connection between said balance arm and said outwardly disposed lever arm, said last mentioned arm having an outer terminal end, and a scale member with respect to which said end is movable for indicating the position of said balance arm.

References Cited in the file of this patent

UNITED STATES PATENTS

| 1,598,128 | Gase | Aug. 31, 1926 |
| 1,734,098 | Smith | Nov. 5, 1929 |
| 2,033,586 | Noble | Mar. 10, 1936 |
| 2,162,219 | Howard | June 13, 1939 |
| 2,883,177 | Dannehl | Apr. 21, 1959 |

FOREIGN PATENTS

| 130,327 | Sweden | Dec. 12, 1950 |